(12) United States Patent
Egenfeldt (10) Patent No.: US 8,589,029 B2
(45) Date of Patent: Nov. 19, 2013

(54) REMOTE CONTROL SYSTEM

(75) Inventor: Svend Egenfeldt, Helsinge (DK)

(73) Assignee: Svend Egenfeldt, Heisinge (DK)

( * ) Notice: Subject to any disclaimer, the term of this patent is extended or adjusted under 35 U.S.C. 154(b) by 893 days.

(21) Appl. No.: 12/095,383

(22) PCT Filed: Nov. 30, 2005

(86) PCT No.: PCT/DK2005/000768
§ 371 (c)(1),
(2), (4) Date: Aug. 28, 2008

(87) PCT Pub. No.: WO2006/018027
PCT Pub. Date: Feb. 23, 2006

(65) Prior Publication Data
US 2009/0222168 A1    Sep. 3, 2009

(51) Int. Cl.
*B62D 5/04* (2006.01)
*B62D 6/00* (2006.01)

(52) U.S. Cl.
USPC ............................................. 701/42; 180/446

(58) Field of Classification Search
CPC .................................. B62D 5/04; B62D 6/00
USPC ................................ 701/41, 42; 180/446, 400
See application file for complete search history.

(56) References Cited

U.S. PATENT DOCUMENTS

| | | | |
|---|---|---|---|
| 2,906,143 A | | 9/1959 | Musser |
| 5,267,627 A | * | 12/1993 | Frank et al. ............. 180/422 |
| 5,803,202 A | | 9/1998 | Bohner et al. |
| 6,041,887 A | * | 3/2000 | Kojo et al. ............. 180/446 |
| 6,488,109 B1 | * | 12/2002 | Igaki et al. ............. 180/169 |
| 6,705,424 B2 | | 3/2004 | Ogawa et al. |
| 6,745,866 B2 | * | 6/2004 | Norman et al. ............. 180/446 |
| 6,899,196 B2 | * | 5/2005 | Husain et al. ............. 180/402 |
| 7,383,917 B2 | * | 6/2008 | Asano ............. 180/446 |
| 7,406,374 B2 | * | 7/2008 | Ono et al. ............. 701/41 |
| 7,431,117 B2 | * | 10/2008 | Ito ............. 180/204 |
| 7,810,608 B2 | * | 10/2010 | Goto et al. ............. 180/446 |
| 2002/0092696 A1 | * | 7/2002 | Bohner et al. ............. 180/405 |
| 2002/0145512 A1 | * | 10/2002 | Sleichter et al. ............. 340/407.1 |
| 2002/0189888 A1 | | 12/2002 | Magnus et al. |
| 2003/0094329 A1 | | 5/2003 | Ogawa et al. |
| 2003/0114969 A1 | * | 6/2003 | Dominke et al. ............. 701/41 |

(Continued)

FOREIGN PATENT DOCUMENTS

| | | |
|---|---|---|
| DE | 19902557 A1 | 7/2000 |
| EP | 0858942 A1 | 8/1998 |

(Continued)

OTHER PUBLICATIONS

Japanese Office Action for JP 2008-542603, issued on Feb. 22, 2011.

*Primary Examiner* — Tuan C. To
(74) *Attorney, Agent, or Firm* — Sughrue Mion, PLLC (57) ABSTRACT

A remote control system comprising a user operated movable input device (1) and a controlled movable device (9) to be controlled in accordance with an input provided via said movable input device. The remote control system has means for providing tactile feed-back to said user via said user operated movable input device. The means for providing tactile feedback comprises a self locking means (5) for effecting motion of said movable input device, so as to move said movable input device in response to actual motion of said controlled movable device.

12 Claims, 5 Drawing Sheets

(56) References Cited

U.S. PATENT DOCUMENTS

| | | |
|---|---|---|
| 2003/0178243 A1* | 9/2003 | Mosler et al. ............ 180/443 |
| 2003/0183440 A1 | 10/2003 | Thomas et al. |
| 2004/0061465 A1* | 4/2004 | Matsuoka ................ 318/432 |
| 2004/0182626 A1* | 9/2004 | Katou et al. ............. 180/226 |
| 2005/0049769 A1* | 3/2005 | Tsuchiya ................. 701/41 |
| 2005/0109556 A1* | 5/2005 | Kubota et al. ........... 180/446 |
| 2005/0121252 A1* | 6/2005 | Tsuchiya ................. 180/446 |
| 2005/0279562 A1* | 12/2005 | Hara et al. .............. 180/402 |
| 2006/0064223 A1* | 3/2006 | Voss ....................... 701/52 |
| 2006/0090952 A1* | 5/2006 | Ito .......................... 180/446 |
| 2012/0116636 A1* | 5/2012 | Dechamp ................. 701/42 |

FOREIGN PATENT DOCUMENTS

| | | |
|---|---|---|
| EP | 1342640 A2 | 9/2003 |
| EP | 1375299 A1 | 1/2004 |
| EP | 1445171 A2 | 8/2004 |
| EP | 1652752 A2 | 5/2006 |
| EP | 1652753 A1 | 5/2006 |
| JP | 2002160649 A | 6/2002 |
| JP | 2003154951 A | 5/2003 |
| JP | 200529016 A | 2/2005 |

* cited by examiner

Legend

▼——▲——▼  Operator input force or torque

■  Operator generated signals

▼—▲—▼  Feedback input

✱  Feedback generated signals

▼—●—▼  Feedback output

REMOTE CONTROL SYSTEM

CROSS REFERENCE TO RELATED APPLICATIONS

This application is a National Stage of International Application No. PCT/DK2005/000768, filed Nov. 30, 2005, the contents of all which are incorporated herein by reference in their entirety.

The present invention relates to remote control system, in particular but not exclusively an automotive steer-by-wire system, comprising a user operated movable input device, a controlled movable device to be controlled in accordance with an input provided via said movable input device, and means for providing tactile feedback to said user via said user operated movable input device.

The automotive industry has a growing interest in steer-by-wire systems. Steer-by-wire systems are understood as systems in which there is no longer a mechanical connection between the steering wheel and the road wheels. Instead steering input is given to electronic sensors in connection with a steering wheel, and the road wheels are then operated according to the steering input by means of hydraulic or electric servo motors. The mechanical connection via the steering column can then be omitted. The omission of the steering column is of particular interest, because the omission of a steering column will inter alia make the configuration of an automobile for left-hand or right-hand drive, respectively, easier, and increase safety for the driver. In respect of the latter this is not only restricted to the passive safety, where, in the event of a crash, the steering column, does no longer present a potential hazard to the driver, but also to active safety such as ESP, collision avoidance, parking aid.

One major drawback of omitting the mechanical connection between the steering wheel and the road wheels is that the immediate feedback from the road wheels to the driver via the steering wheel is lost. The driver thus looses the sense of the behaviour of the road wheels, e.g. whether no steering action is possible because the road wheels have lost grip on a slippery surface, or whether the road wheels cannot or should not be turned, because they are blocked by an obstacle such as a kerb. Moreover, the velocity dependent counteraction of the road surface to the force applied to the steering wheel is lost.

Attempts have been made to overcome this drawback by introducing a reaction force to the steering wheel so as to impart on the driver the impression of in particular the velocity dependent counteraction of the road wheels.

Two such systems are known from EP-A-1445171 and U.S. Pat. No. 6,659,218, respectively. An important aspect of both those systems, however, is that they maintain a steering column for the event of failure of the steer-by-wire system. The steering column is split in two parts, which are normally disengaged, but may engage in the event of a failure of the steer-by-wire system in order to allow conventional steering. In EP-A-1445171 a steering reaction motor is connected to one part, i.e. the shaft of the steering wheel, via a worm gear mechanism for imparting a steering reaction force to the steering wheel. To the other part, i.e. the output shaft, a steering motor is connected via another worm gear mechanism. Both of the worm gear mechanisms are reversible, and may transmit force in either direction. In U.S. Pat. No. 6,659,218 nothing is said about reversibility of the worm gear mechanism. The skilled person will, however, understand this as a necessity, as the worm gear mechanism would otherwise compromise the conventional steering, when the two parts of the steering column engage in the event of a failure of the steer-by-wire system.

Apart from the fact that these systems maintain the steering column, and thus do not overcome all the problems mentioned above, it should be noted that the reaction force introduced does not reflect the actual behaviour of the steering wheels. In particular, these systems would thus not necessarily generate a reaction force corresponding to a situation as described above where the road wheel is blocked or hindered by an obstacle. Moreover they would not prevent the driver from moving the steering wheel too far or too fast. Furthermore such systems would be undesirable in that the generated reaction force could very easily create a new steering input to the system.

It is the object of the present invention to provide a remote control system, which overcomes this and other problems.

According to a first aspect of the invention, these problems are solved by a remote control system comprising a user operated movable input device, a controlled movable device to be controlled in accordance with an input provided via said movable input device, and means for providing tactile feedback to said user via said user operated movable input device, characterized in that said means for providing tactile feedback comprises a self locking means for effecting motion of said movable input device, so as to move said movable input device in response to actual motion of said controlled movable device.

By introducing a self locking means as a blocking mechanism, the input device itself initially counteracts any attempt to move it with a reaction force corresponding to the force exerted thereon. Consequently, the input device initially remains stationary. However, the force exerted thereon is detected, and the system attempts to move the controlled device accordingly. If the controlled device moves, the self locking means itself effects the motion of the input device controlled device in accordance with the motion of said controlled device. Thus, if the controlled device moves, the input device follows accordingly, giving the user the impression that he himself is moving the input device. Thus, there is effectively provided a feedback link between the controlled device and the input device, giving the same feeling for the user as the conventional mechanical link.

According to a second aspect of the invention the problems are solved by a method for providing tactile feedback in a remote control system comprising a user operated movable input device with a self locking means, and a controlled movable device to be controlled in accordance with an input provided via said movable input device, said method comprising detecting a user input applied to the user operated input device, moving if possible said controlled device in accordance with said user input, moving by means of said self locking means said user movable input device in accordance with the actual motion of said controlled device.

With this method a feedback to the user is established. The feedback involving a direct response of the input device to the actual motion of the controlled device, and thus conveys the user the known feeling from conventional mechanical steering systems.

According to a preferred embodiment, the user operated movable device is selected from the group comprising a joystick, a steering wheel and a pedal. Both steering wheels and joysticks are already widely accepted for steering automotive vehicles such as a automobiles, trucks or forklifts, and joystick and pedals as such are well accepted for the control of aeroplanes.

According to a further preferred embodiment the controlled movable device is a road wheel of an automotive vehicle. The present invention is well suited for the control of road wheels of automobiles. Automobiles are of particular interest because the users are generally not as highly skilled as e.g. aircraft pilots, and it is therefore more important to convey the ordinary user the feeling of road contact with which he is familiar from conventional mechanical steering systems.

According to a specifically preferred embodiment said means for blocking motion of said movable input device is a self locking gear, and said means for relieving said blocking is an electric motor coupled to said self locking gear. Self locking gears and the properties thereof are commonly known. It is thus not complicated to implement such gears in steering systems according to the invention.

In particular it is in this respect preferred that said self locking gear is a worm gear. The use of a worm gear facilitates the use of a redundant system.

Thus according to a further preferred embodiment, the worm of said worm gear is connected to two electric motors. By placing two electric motors in connection with the worm, e.g. one motor in connection with each end thereof, it is still possible to control the vehicle and get the proper feedback even if one electric motor should fail.

In a preferred embodiment of the method according to the invention the self locking means is moved by means of an electric motor. It is preferable to use an electric motor in the method, because electric motors are readily controllable, e.g. by means of a computer.

In a further preferred embodiment of the method according to the invention, the controlled movable device is a road wheel of an automotive vehicle. The method, though applicable in numerous fields of manipulation, is particularly suited for motor vehicles, mainly because the combination of a steering wheel and mechanical connection to the wheel is already so widely that most present day users are highly familiar with it.

In a particularly preferred embodiment of the method, the user input is detected and transmitted to a control device as an input signal, said control device delivers a first control signal to the controlled movable device, the motion of the controlled movable device in response to the first control signal is measured and fed back to the control device as a feedback signal, the control device delivers a second control signal to said self locking means based on said feedback signal, and the self locking means is moved in accordance with the second control signal.

This allows for easy implementation of the method in actual devices such as automobiles, aeroplanes and remote control devices.

The invention will now be explained in greater detail, based on non-limiting exemplary embodiments and with reference to the schematic drawings. In the drawings.

In the following description of different embodiments of the invention, the same reference numerals are used for corresponding elements in the different embodiments. Moreover, parts depicted with interrupted lines represent redundant system parts corresponding essentially to the parts of the system drawn in full lines. To avoid unnecessary repetition, the parts depicted in interrupted lines will only be described as far as reference to them is necessary in the description of the part of the system drawn in full lines.

Figure 1:
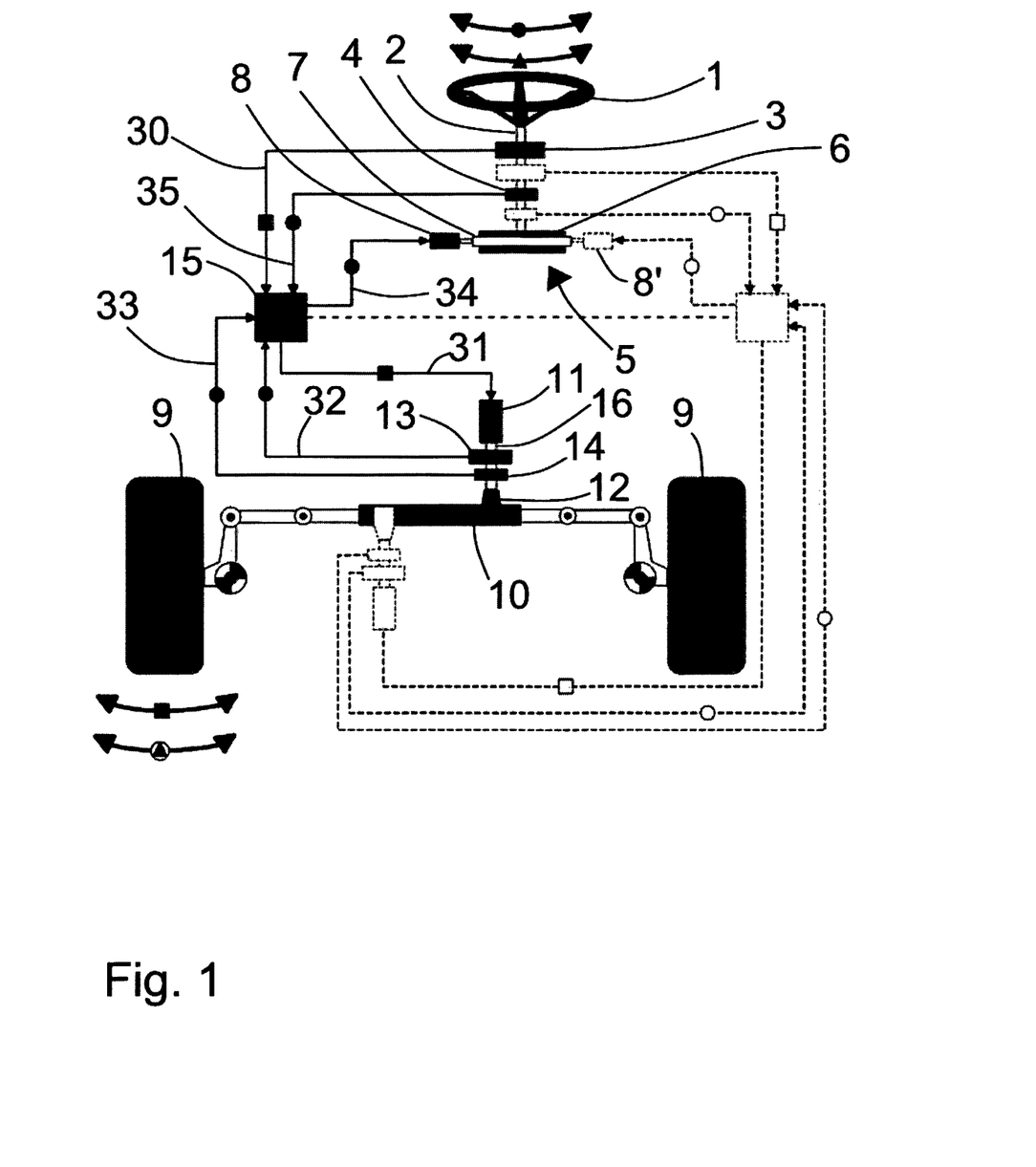
FIG. 1 is a schematic diagram of the invention implemented as steer-by-wire in an automobile.

FIG. 1 is a schematic diagram of the steer-by-wire system according to the invention implemented in an automotive vehicle, such as an automobile, a forklift, or a lorry.

The automotive vehicle has a user operated movable input device 1 in the form of a steering wheel. The input device 1 is mounted on a steering wheel shaft 2. In connection with the steering wheel shaft 2, a torque sensor 3 and a position sensor 4 are mounted. Also, in connection with the steering wheel shaft 2, a self locking means for 5 is mounted. In the embodiment shown, the self locking means comprises a self locking worm gear, comprising a worm wheel 6 and a worm 7. The worm wheel 6 is rigidly connected to the steering wheel shaft 2. One end of the worm is rigidly connected to a motor 8, preferably an electric motor. For safety reasons the other end of the worm 7 is preferably connected to another electric motor 8' forming part of a redundant system, as will be explained below.

The automotive vehicle furthermore has a controlled movable device 9, in the form of a pair of road wheels. Here, it should be noted that the skilled person will know that the actual number of wheels is not important for the invention, as automotive vehicles are conventionally steered by one, two or four wheels. In the depicted embodiments wheels are operated via a conventional steering rack 10, by means of a steering motor 11, such as an electric motor, via e.g. a pinion 12 mounted on the motor shaft 13. In connection with the motor shaft 13 there is also mounted a torque sensor 13 and a position sensor 14.

According to the invention, a mechanical link between the user operated movable input device 1 and the controlled movable device 9 is not necessary. Instead the two parts are coupled only via a control device 15. The control device 15 receives signals from the torque sensors 3, 13 and position sensors 4, 14 and produces control signals for the motors 8, 11. Preferably the signals are electric signals, but at least some of the signals could instead be optical.

Figure 5:
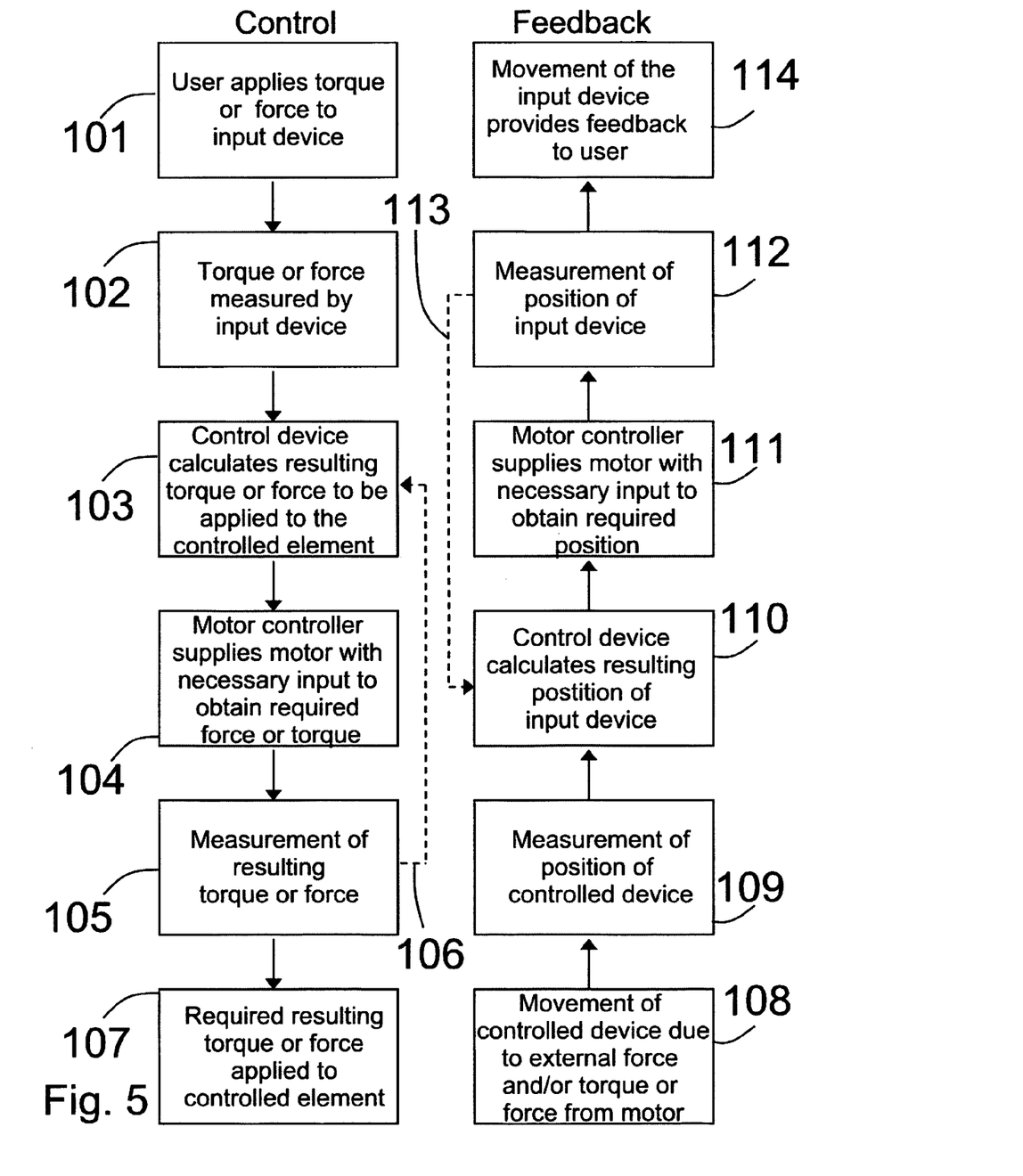
FIG. 5 illustrates the method according to the invention by means of two flow charts.

The operation of the system is illustrated in FIG. 5 by means of two flow charts. With reference to FIGS. 1 and 5 the operation of the system is as follows. Assuming first that the driver wants to turn the road wheels of the automotive vehicle, the driver acts by attempting to turn the steering wheel 1 of the automotive vehicle by applying a force thereto (box 101 in FIG. 5). In this respect it should be noted that throughout this description the expression turning the road wheels 9 refers to the sideways motion of the road wheels 9 for steering, and not to any rotary motion of the road wheels 9. The force in this case translates to a torque on the steering wheel shaft 2, in the following termed wheel shaft torque. This wheel shaft torque is measured by the torque sensor 3 (box 102 in FIG. 5), and transmitted as an input signal to the control device 15, via a transmission line 30. The driver, however, is not able to actually turn the steering wheel 1, because of the self locking means 5, where the worm 7 blocks the worm wheel 6, and thus the steering wheel shaft 2 from any rotary motion. Preferably based on the wheel shaft torque measured, the control device 15 computes a first control signal (box 103 in FIG. 5) to a steering motor 11 for turning the road wheels 9 via the rack 10 and the pinion 12 mounted on the steering motor shaft 16. This first control signal is sent to the steering motor or a drive unit thereof (not shown) via a transmission line 31 (box 104 if FIG. 5). The steering motor 11 is preferably an electric or hydraulic motor. The torque produced on the motor shaft 16 of the steering motor 11 is measured by means of the torque sensor 13, and transmitted to the control device 15 via a transmission line 32 (box 105 in FIG. 5). In the following this torque is termed steering motor torque.

The steering motor torque measured is transmitted to the control device 15 (broken line 106 in FIG. 5), which ensures that the steering motor produces a steering motor torque corresponding to the wheel shaft torque (box 107 in FIG. 5). The skilled person will know that this correspondence between steering wheel torque and steering motor torque will preferably be proportional, but may also be logarithmic, exponential, assume discrete values, or depend on the position of the wheels or the speed of the vehicle.

Also, the rotary position of the output shaft 16 is measured (box 108 in FIG. 5), and transmitted as a feedback signal to the control device via a transmission line 33. This rotary position corresponds to the position of the steering rack 10 and thus to the position of the wheels. It can thus be determined whether or to which degree the wheels turn under the influence of the steering motor 11, or external influences. If the wheel cannot turn, e.g. because it is blocked by a kerb, this is detected by the control device 15. Moreover it may be determined when the wheels 9 have reached the extreme positions which cannot and must not be exceeded. Furthermore a non-proportional relation between the rotary angle of the steering wheel shaft 2 and the rotary angle of the steering motor shaft 16 may be obtained, e.g. depending on the speed of the automobile. Such a speed dependent relation, may allow small movements of the steering wheel shaft 2 to translate into large movements of the wheels 9 at low speed, as an aid in parking, and large movements of the steering wheel shaft 2 at high speeds to translate into smaller movements of the wheels, so as to increase the stability of the automobile at high speeds. In such cases the correspondence between steering wheel torque and steering motor torque may also not be proportional.

In either case the control device 15, monitors the steering motor torque (broken line 106 in FIG. 5) produced by the steering motor 11 and maintains a value corresponding to the steering wheel torque applied to the steering wheel 1 by the driver. The torque produced by the steering motor 11 must neither exceed nor fall below the value corresponding to the user input on the steering wheel.

Now, when the wheels 9 start turning to either left or right (box 108 in FIG. 5), based on the input to the steering wheel 1, or due to an external influence, this will be detected by the position sensor 14 (box 109 in FIG. 5), and transmitted as the feedback signal to the control device 15 via the transmission line 33. The control device then (in box 110 in FIG. 5) calculates or otherwise produces a second control signal to the motor 8 connected to the worm 7. Under the influence of the second control signal transmitted from the control device 15 via a transmission line 34, the motor then turns the steering wheel shaft 2 (box 111 in FIG. 5), via the worm 7 and the worm wheel 6, in accordance with the motion of the road wheels 9. In order to detect how far the steering wheel 1 turns, the position of the steering wheel shaft 2 is measured by the position sensor 4 (box 112 in FIG. 5), and fed back to the control device 15 via the transmission line 35 (broken line 113 in FIG. 5), so as to allow the control device 15 to ensure that the steering wheel 1 only turns an angle corresponding to the turn of the road wheels 9. As explained above the relation between the wheel shaft 2 and the actual motion of the wheels 9 and hence the steering motor shaft 16 need not be linear. Thus as the road wheels 9 turn, the steering wheel 1 will move (box 114 in FIG. 5) under the influence of the motor 8, giving the driver the appearance that the steering wheel is moving under the influence of the torque he applies to it. In fact the driver cannot actually move the steering wheel 1 himself, except to the extent necessary to take up any slack in the between the worm wheel 6 and the worm 7 and keep them in the engagement, which produces the counter torque, countering the torque he applies. In this respect it should be noted that normally there is not should not be any slack at all, because a large part of the feedback feel in terms of road grip and road surface condition, rely on very small variations in force and position of the steering wheel 1.

If the road wheels 9 do not turn under the torque produced by the steering motor 11, e.g. because one of them is blocked by a kerb, the position sensor does not deliver any signal to the control device or delivers a signal indicating that the road wheels 9 do not move. How the information to the control device 15 that the road wheels 9 do not move is communicated is a mere matter of signalling, which is within the realm of the skilled person. Preferably the system continuously measures the actual position at the position sensor 14, and transmits the information to the control device 15. If the road wheels 9 do not move, no control signal is provided to the electric motor 8. Consequently the worm 7 does not move and blocks the motion of the worm wheel 6, thus countering any torque applied to the steering wheel 1 by the driver. Evidently the steering wheel 1, the steering wheel shaft 2, the worm wheel 7 and the worm 6, should all be so dimensioned that they will resist any torque or force applied by the driver, or otherwise occurring, without breaking. When a road wheel 9 is blocked the driver is thus conveyed the feeling thereof, because he cannot turn the steering wheel 1.

If during drive the road wheel 9 hits a smaller obstacle, such a hit may temporarily turn the road wheel 9, before the automatic alignment built into the suspension aligns the wheel 9. This motion will be detected by the position sensor 14, and transmitted via the transmission line 33 to the control device 15. The control device 15 in turn calculates a control signal for the motor 8, which is then transmitted thereto via transmission line 33. The motor 8 then operates the self locking mechanism, and turns the steering wheel 1. A feedback for the driver is thus produced. As the road wheel 9 is realigned, new position signals will be measured and the control device 15 will cause the steering wheel 1 to follow the realignment, thus providing continuous feedback to the driver.

Similarly, when the torque applied by the driver to the steering wheel 1, translates to a torque produced by the steering motor 11 allowing it to turn the road wheels 9 at a given rate, the motor 8 will move the steering wheel 1 at a corresponding rate. The steering wheel 1 thus can only be moved at a rate corresponding to the rate which the road wheels 9 actually move as a response to the torque applied to the steering wheel 1 by the driver. Due to the torque applied to the steering wheel 1 by the driver, he will get the impression that he is moving the steering wheel 1, but actually he is unable to move it at all by himself.

In the cases where the steering wheel 1 is able to be moved by the motor 8 corresponding to the input of the driver, the position sensor 4 detects the motion and communicates this to the control device 15 via a transmission line 35, in order to allow the control device 15 to keep track of how much the motor 8 actually moves the steering wheel 1 in response to the control signal on line 34.

In order to make the system failsafe the entire system presented above may be duplicated, except for those parts, which, due to the construction of the automobile need to be common to both systems, i.e. the steering wheel 1, steering wheel shaft 2, road wheels 9 and steering rack 10. These parts are reproduced in interrupted lines and will not be discussed in detail. It should however be noted at both the motor 8 and its corresponding double, the motor 8' are connected to one and the same worm 7, rather than each having a worm in engagement with the worm wheel 6. Though the latter is also possible the former is preferred. The reason that in the event of failure of one of the motors 8, 8' either by itself or by the devices controlling it, the worm 7 will not lock the worm wheel 6, because the remaining functioning motor will be able to turn the failed one via the worm 7.

Failure of one system during operation will thus not prevent steering. Evidently, in the event of failure safety precautions should be taken. These could include only allowing the automobile to be driven at very low speeds, until the redundancy of the systems has been restored. It should be noted that preferably both of the redundant systems operate concurrently and independently.

Though in the above description the blocking means is described as a self locking worm gear, other means could be used, e.g. harmonic drives as known from U.S. Pat. No. 2,906,143.

Figure 2:
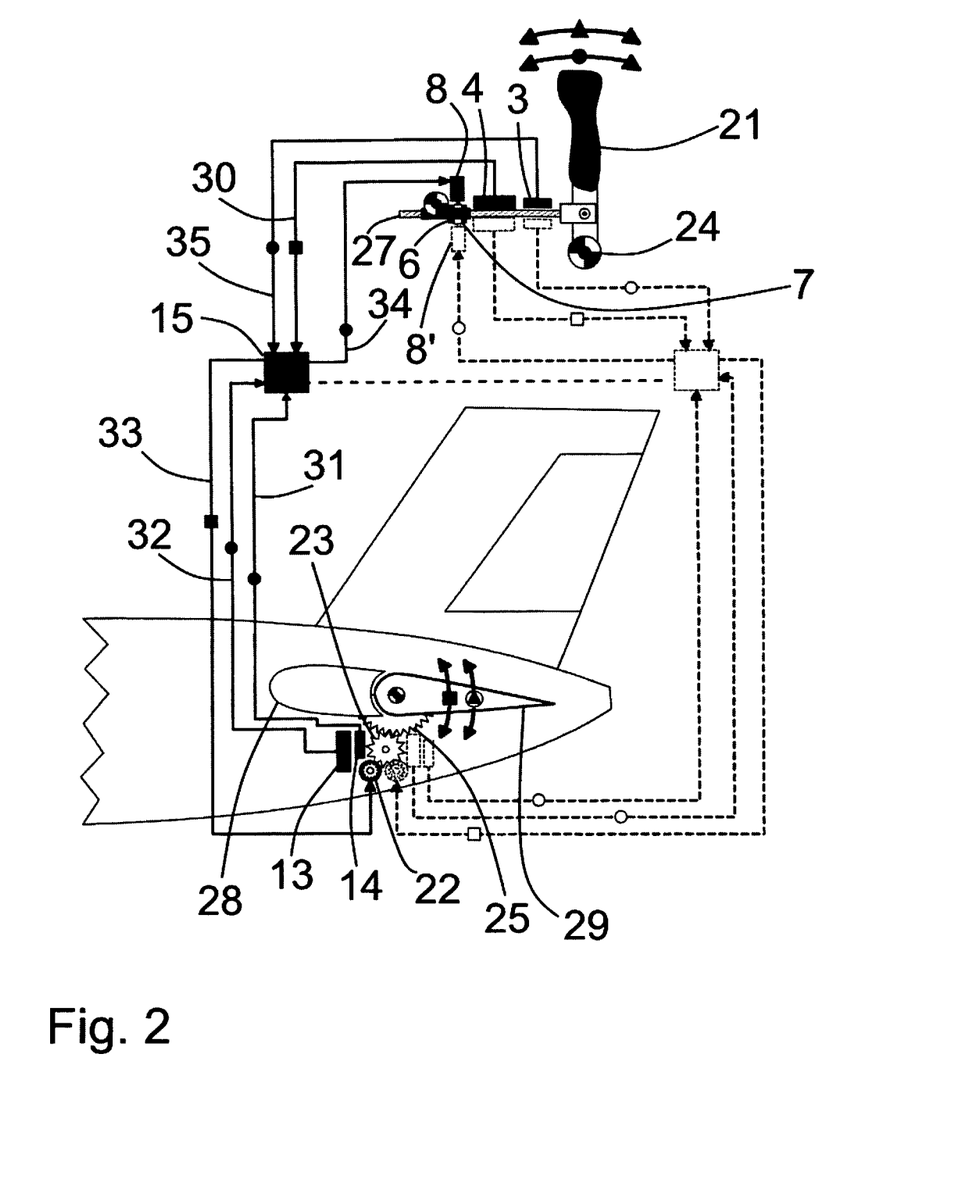
FIG. 2 is a schematic diagram of the invention implemented as fly-by-wire in an aircraft using an electric motor.

FIG. 2 shows the invention implemented in an aircraft, in particular for controlling the elevators 29 thereof.

Here the input device is a control stick 21. For simplicity the control stick 21 illustrated with only one axis of rotation 24 corresponding to the elevators 29 in the tailplane 28 of the aircraft. The skilled person will know that the control stick 21 is also normally also movable in the cross direction, and would know how to implement the invention for this cross direction.

The control stick 21 is connected to a threaded spindle 27 by means of a hinge mechanism 24. The threaded spindle may be made to reciprocate by e.g. means of a wandering nut arrangement, driven by a worm gear, the wandering nut having an external thread forming the worm wheel 7 of the worm gear. It should be noted that the wandering nut only moves with respect to the spindle 27. Except for its on rotary motion it is actually stationary whereas the threaded spindle moves. In connection with the threaded spindle 27 there is mounted a force sensor 3 and a position sensor 4 providing the necessary information to the control device 15. The control device 15 provides a first control signal for a motor 22, preferably an electric motor. The motor 22 moves the elevator 29 up and down via a gear train 23, 25, the gear 25 being connected to the elevator 29. This motion is detected by means of the position sensor 14, arranged e.g. in connection with the gear 23. This position sensor 14 provides the feedback signal for the control device 15 via the transmission line 31. The control device 15 produces a second control signal for the electric motor 8, which then drives the worm wheel 7, i.e. the wandering nut, by means of a worm 6. Thus the control stick 21 is moved in accordance with the movement of the elevator 29. This movement of the control stick 21 is independent of whether the elevator moves as a result of the motor 22 responding to a desired input to the control stick 21, or whether an external force moves the elevator 29, e.g. the wind pressure.

Figure 3:
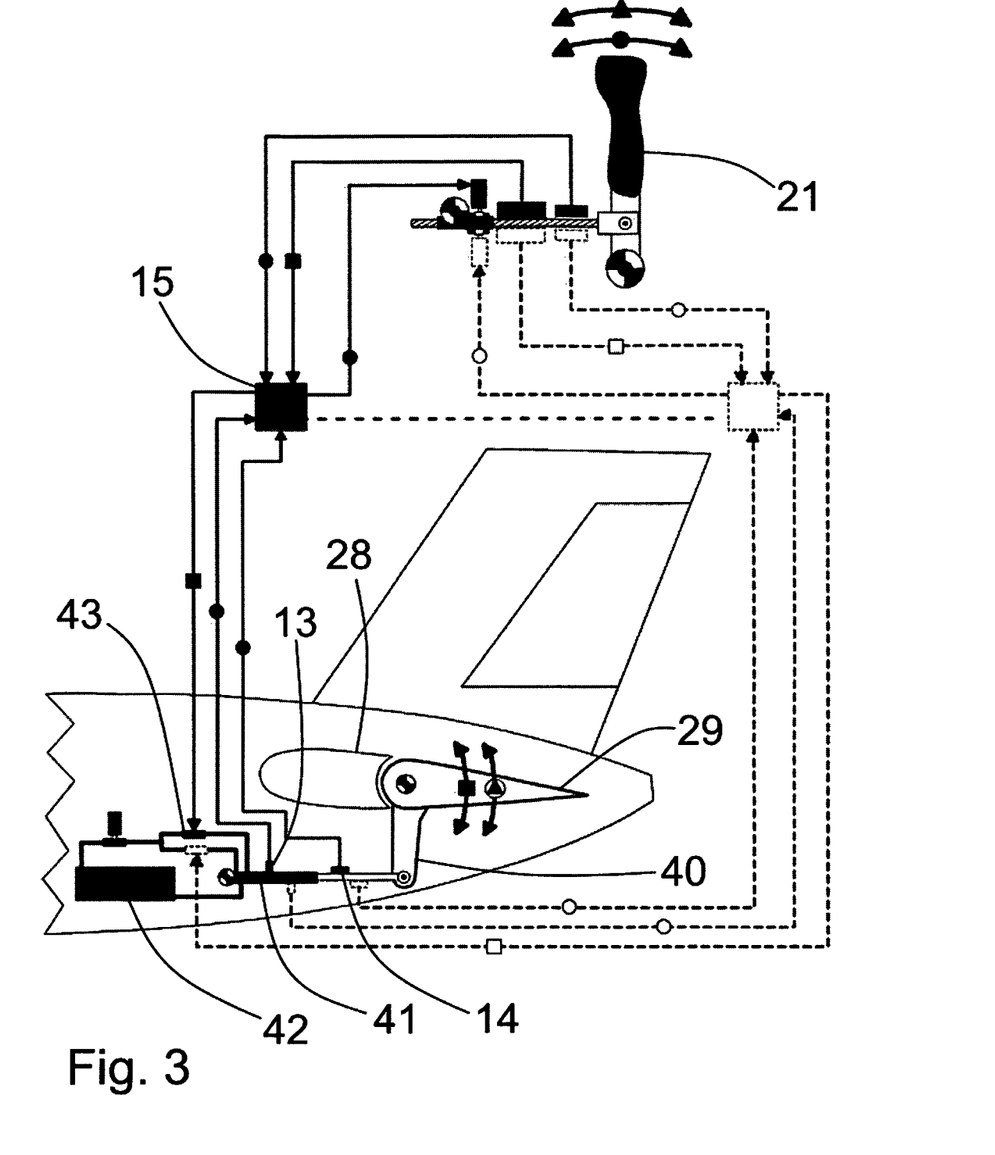
FIG. 3 is a schematic diagram of the invention implemented as fly-by-wire in an aircraft using a hydraulic motor.
Figure 4:
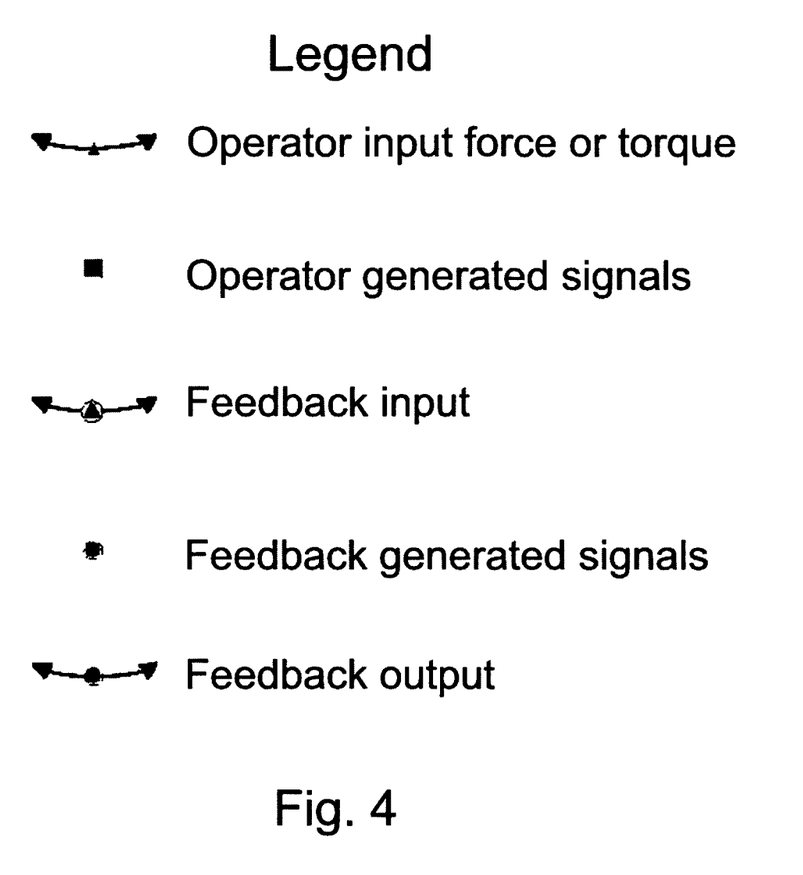
FIG. 4 is the legend for the symbols used in FIGS. 1 to 3.

FIG. 3 shows the invention implemented in an aircraft, in particular for controlling the elevators 29 thereof by hydraulic means.

In this embodiment the elevator 29 is moved by means of lever 41, to which a force is applied by means of a linear hydraulic actuator 40 connected to the lever 41. Though not shown it may be preferable to use one linear hydraulic actuator for each direction of movement of the elevator 29. The hydraulic pressure for the linear hydraulic actuator is supplied from a pressure source 42 via a valve 43, controlled by a first control signal from the control device 15. In connection with the linear hydraulic actuator a force sensor 13 and a position sensor 14 are mounted. Again, like in the previous embodiments the position sensor provides a feedback signal to the control device 15, which in turn moves the input device according to the actual movement of the controlled device so as to provide the feedback. Due to the spindle and wandering nut arrangement the pilot himself is unable to move the control stick 21.

The skilled person will understand that combinations of the features of the embodiments, such as the use of electric and hydraulic means, different type of blocking mechanisms, different types of commonly used input devices could be combined.

It should be also be noted that the above embodiments are only simple examples of how such a system may be implemented, actual steering gear for automobiles and control surfaces of aeroplanes may constructed in a far more complex manner than illustrated, without deviating from the inventive idea of only allowing moving the input device in response to an actual movement of the controlled device. In this respect, it should furthermore be noted that actual motion of the controlled device does not necessarily imply that the controlled device is physical. The invention could also be applied to virtual influences from virtual obstacles e.g. in simulators or computer games.

The present invention thus provides a feedback method, where only an actual movement of the controlled device results in a movement of the input device. In other words, a self locking mechanism is used for blocking motion of said movable input device by the user himself. The self locking means however is being used in combination with means operating said self locking means so as to relieve said blocking in response to actual motion of said controlled movable device.

LIST OF REFERENCE SYMBOLS steering wheel 1
steering wheel shaft 2
torque sensor 3
position sensor 4
self locking means 5
worm wheel 6
worm 7
motor 8, 8'
controlled movable device 9
steering rack 10
steering motor 11
pinion 12
torque sensor 13
position sensor 14
control device 15
steering motor shaft 16
control stick 21
motor 22
gear train 23, 25
axis of rotation 24
threaded spindle 26
tailplane 28
elevator 29
transmission line 30
transmission line 31
transmission line 32
transmission line 33
transmission line 34
transmission line 35
lever 40
linear hydraulic actuator 41
hydraulic pressure source 42
valve 43

The invention claimed is:

1. A steer-by-wire system comprising:
a user operated movable input device;
means for detecting a force or a torque input to said user operated movable input device;
a controlled movable device controllable in accordance with the input provided via said user operated movable input device,
means for detecting motion of said controlled movable device; and
means for providing tactile feedback of said detected motion to said user via said user operated movable input device, wherein said means for providing tactile feedback comprises:
moving means for moving said user operated movable input device only in response to detected motion of said controlled movable device, said moving means having a locking device that prevents movement of said user operated input device directly by the user.

2. A steer-by wire system according to claim 1 wherein the user operated movable input device is selected from the group comprising a joystick, a steering wheel, and a pedal.

3. A steer-by-wire system according to claim 1, wherein the controlled movable device is selected from the group consisting of a road wheel of an automotive vehicle, a flap, aileron, an elevator or a rudder of an aircraft.

4. A steer-by-wire system according to claim 1 wherein said moving means is a motor and said locking device is a self locking gear, said motor being coupled to said self locking gear.

5. A steer-by-wire system according to claim 4, wherein said self locking gear is a worm gear.

6. A steer-by-wire system according to claim 5 wherein said moving means includes a second motor and wherein the worm of said worm gear is connected to both motors.

7. A method for providing tactile feedback in a steer-by-wire system comprising a user operated movable input device; and a controlled movable device to be controlled in accordance with an input provided via said movable input device,
said method comprising:
detecting a user input applied to the user operated movable input device, and transmitting a related input signal to a control device, said user input being a force or a torque;
delivering from the control device a control signal to the controlled movable device and moving, if possible, said controlled device in accordance with said said control signal;
detecting movement of said controlled movable;
causing said user movable input device to be moved only in accordance with the detected movement of said controlled movable device; and
preventing direct movement of said input device by the user.

8. A method according to claim 7, wherein said user moveable input device is moved by a motor.

9. A method according to claim 7, wherein said controlled movable device is a road wheel of an automotive vehicle.

10. A method according to any one of claims 8,
wherein the control signal is a first control signal,
wherein the motion of the controlled movable device in response to the first control signal is measured and fed back to the control device as a feedback signal,
wherein the control device delivers a second control signal to said motor based on said feedback signal,
wherein the motor is moved in accordance with the second control signal, and
wherein the direct movement of the input device by the user is prevented by a locking device coupled to the motor.

11. A steer-by-wire system comprising:
a user operated movable input device;
a sensor that detects a force or a torque input to said user operated movable input device;
a controlled movable device controllable in accordance with the input provided via said user operated movable input device;
a sensor that detects motion of said controlled movable device;
a selective moving mechanism that interchangeably blocks and allow motion of said user operated movable input device to provide tactile feedback to a user, and
a control device configured to control said selective moving mechanism, so that said user operated movable input device is moved only in response to the detected motion of said controlled movable device.

12. The steer-by-wire system according to claim 11, wherein the selective moving mechanism comprises a motor and a worm gear coupled to the motor, said worm gear moving the input device when driven by the motor.

* * * * *